S. K. PRESCOTT.
STEERING MECHANISM FOR MOTOR DRIVEN TRACTORS OR TRUCKS.
APPLICATION FILED MAR. 22, 1920.

1,359,739.  Patented Nov. 23, 1920.

INVENTOR
SUMNER K. PRESCOTT
BY
Richard J. Cook
ATTORNEY

UNITED STATES PATENT OFFICE.

SUMNER K. PRESCOTT, OF SEATTLE, WASHINGTON.

STEERING MECHANISM FOR MOTOR-DRIVEN TRACTORS OR TRUCKS.

1,359,739.  Specification of Letters Patent.  Patented Nov. 23, 1920.

Application filed March 22, 1920. Serial No. 367,728.

*To all whom it may concern:*

Be it known that I, SUMNER K. PRESCOTT, a citizen of the United States, and resident of the city of Seattle, county of King, and State of Washington, have invented certain new and useful Improvements in Steering Mechanism for Motor-Driven Tractors or Trucks, of which the following is a specification.

This invention relates to improvements in steering mechanism for motor driven tractors or trucks, and more particularly to mechanism wherein the steering post terminates forwardly of the steering knuckle connecting rod as distinguished from mechanism of this character wherein the post terminates rearwardly thereof.

In the building of trucks of the character to which the present steering mechanism is applied, it is desirable, in order to provide a compact arrangement of parts, to locate the steering post as far forward as is possible, and as a consequence, this necessitates a different steering connection than is ordinarily used.

It is therefore the object of the invention to provide a steering connection which will function in the same manner as does the ordinary automobile steering mechanism and which, at the same time, is made with a steering post considerably in advance of the wheels that are controlled thereby.

In accomplishing this object I have provided the improved details of construction, the preferred forms of which are illustrated in the accompanying drawings, wherein—

Figure 1:
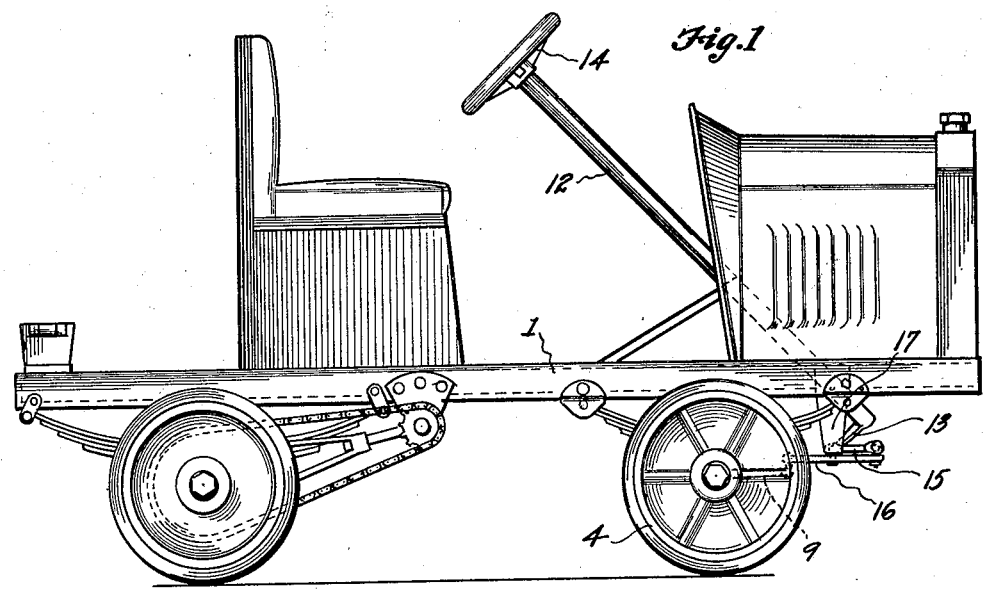
Figure 1 is a side view of a truck equipped with steering mechanism according to the present invention.
Figure 2:
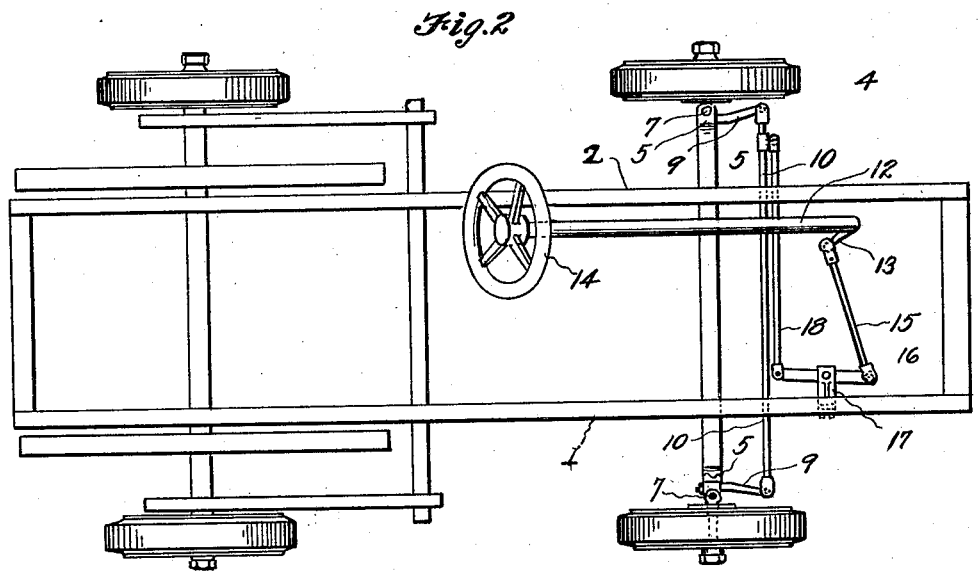
Fig. 2 is a plan view of the steering parts as connected to the steering wheels and vehicle frame.

Referring more in detail to the drawings—

1 and 2 designate the longitudinal side beams of a truck frame, 3 the front axle and 4 the front, steerable wheels of the truck; the latter being mounted on the spindles of steering knuckles 5, pivotally mounted, in the usual manner, on vertical pins 7 in the yokes 8 at the opposite ends of the axle.

Steering arms 9 extend forwardly and slightly outwardly from the knuckles and at their forward ends are connected by a rod 10, which retains the wheels on steerable alinement.

The steering post 12, mounted at one side of the vehicle, has the usual crank arm 13 at the lower end, which is actuated through turning of the steering wheel 14, and this crank arm is connected by means of a rod 15 with the forward end of a rocker lever 16 that is pivotally mounted at its center by means of a bracket 17 secured to the frame rail 2. The rearward end of the lever 16 is connected by means of a radius rod 18 with the cross rod 10, so that rocking of this lever 16 will control the steering of the wheels 3.

All of the connections between the rods 15 and 18 with the arm 13 and lever 16 are made through ball and socket connections, as indicated by 20, so as to permit the movement necessary to proper operation of the parts.

With this connection it is apparent that turning of the steering wheel 14 will actuate the arm 13 to move the lever 16 and the latter will shift the rod 10 longitudinally to move the wheels 4 accordingly.

Such an arrangement permits the steering post to be located considerably farther forward with respect to the steering wheels than is ordinarily possible and a desirable arrangement is accomplished for the purpose for which the present vehicle is intended.

What I claim as new and desire to protect by Letters Patent, is:

The combination in a vehicle of the character described, comprising a front axle, steerable spindles at the ends of said axles, wheels on said spindles, a rod connecting said spindles and a steering post having a steering arm forwardly of the said axle, of a bracket secured at the side of the vehicle frame opposite the steering post and forwardly of the axle, a rocker lever pivoted at its center in said bracket, a rod connected pivotally at its opposite ends to the forward end of said lever and to the steering post arm and a rod pivotally connected at one end to the rearward end of said lever, extending toward the opposite side of said vehicle and pivotally connected to the spindle connecting rod.

Signed at Seattle, Washington, this 5th day of March, 1920.

SUMNER K. PRESCOTT.